June 27, 1961 J. M. BIEN 2,990,008
HEAD AND BACK REST
Filed Dec. 22, 1958 2 Sheets-Sheet 1

INVENTOR,
JACK M. BIEN;
BY
ATTORNEY

June 27, 1961   J. M. BIEN   2,990,008
HEAD AND BACK REST
Filed Dec. 22, 1958   2 Sheets-Sheet 2
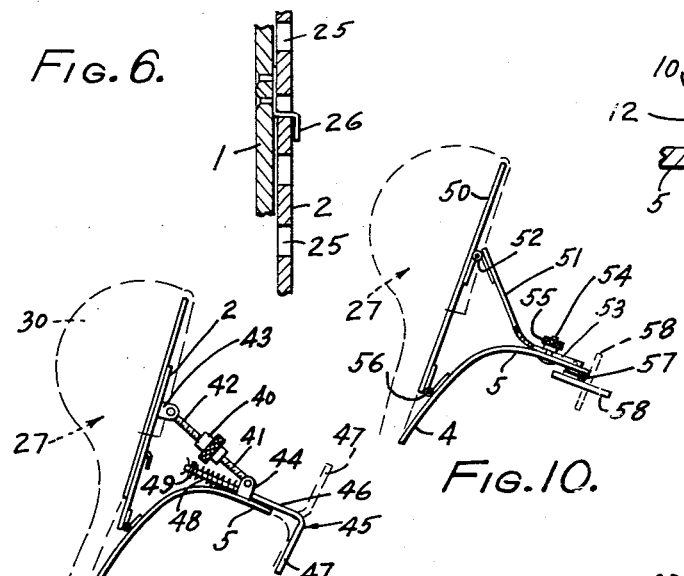
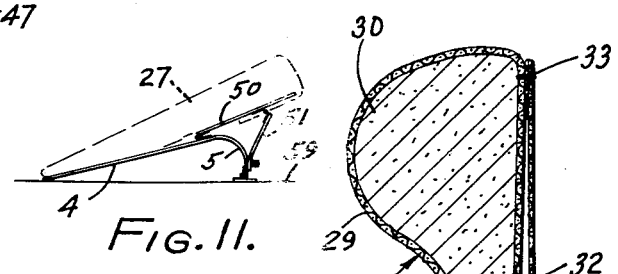
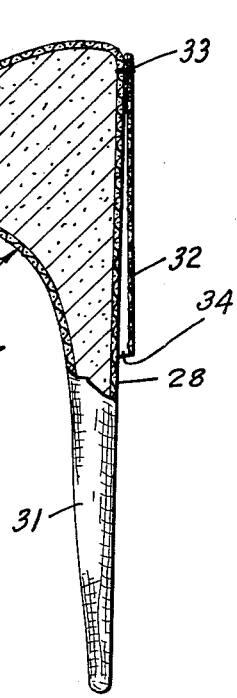
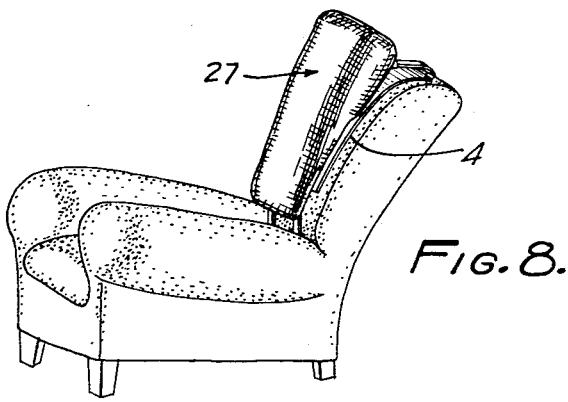
INVENTOR,
JACK M. BIEN;
BY
ATTORNEY

United States Patent Office 2,990,008
Patented June 27, 1961

2,990,008
HEAD AND BACK REST
Jack M. Bien, 6411 Warner Drive, Los Angeles, Calif.
Filed Dec. 22, 1958, Ser. No. 782,092
1 Claim. (Cl. 155—177)

The present invention contemplates a head and back rest which may be detachably secured to the back of a vehicle seat or to a chair or sofa and which provides an adjustable support for the neck, back and head in accordance with the desire of the user.

Particularly in vehicles, it is desirable to provide some support for the back, neck and head of the driver of the vehicle, although passengers will find the present invention equally desirable and useful in the relief of fatigue.

A device of the character of the present invention when in use particularly in a vehicle insures the user that in case of accident such as a collision, maximum protection is afforded the user against neck injury which frequently occurs when the head is thrown violently backwardly and then forwardly.

Another object is to provide a support which is adjustable relative to a seat back and likewise adjustable as to position so as to support the neck and head of the user.

Other objects include a head and back rest of attractive appearance which will blend with its surroundings, easily attached and removed from a seat back, inexpensive in cost of manufacture and generally superior to head and back rests now known to the inventor.

In the drawing:

FIGURE 5 is an enlarged fragmentary, sectional view, on the line 5—5 of FIGURE 2;

FIGURE 6 is a fragmentary sectional view, on an enlarged scale, taken on the line 6—6 of FIGURE 3;

FIGURE 7 is a fragmentary partially sectional view of a cushion which may be used in the practice of the invention;

FIGURE 8 is a perspective view of the invention shown applied to the back of a lounge type chair;

FIGURE 9 is a fragmentary side elevation of a modified form of the invention;

FIGURE 10 is a fragmentary side elevation of a further modified form of the invention; and FIGURE 11 shows an adaptation of the invention shown in FIGURE 10.

Figure 1:
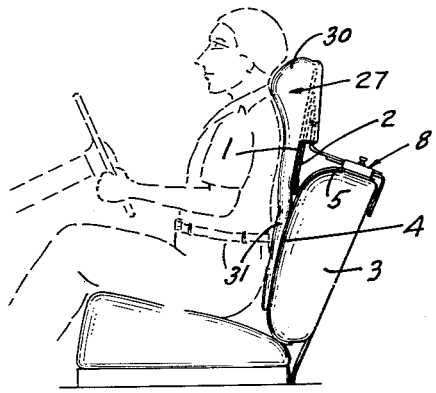
FIGURE 1 is a fragmentary side elevation of the head and back rest of the invention shown attached to the back of a seat in position for supporting the back, neck and head of the driver of a vehicle.
Figure 2:
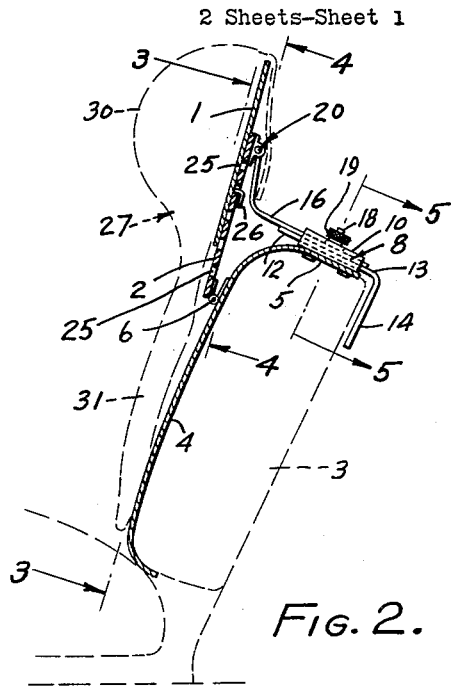
FIGURE 2 is a fragmentary side elevation showing a portion of the vehicle seat with the portions of the back and head rest shown in section, the cushion for said back and head rest being illustrated by dotted lines.
Figure 3:
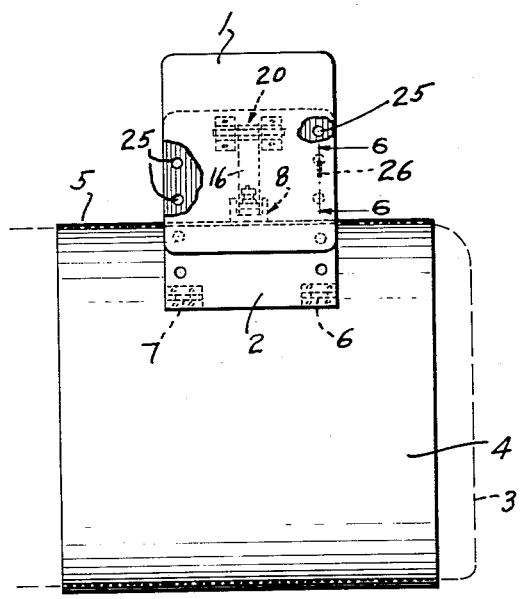
FIGURE 3 is a fragmentary sectional view on the line 3—3 of FIGURE 2.
Figure 4:
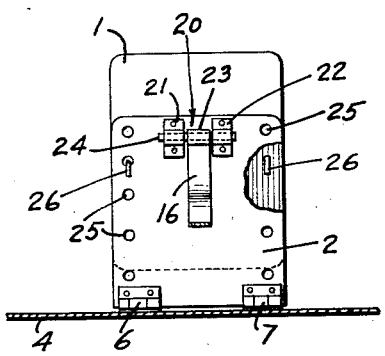
FIGURE 4 is a fragmentary, sectional rear elevation on the line 4—4 of FIGURE 2.

Referring now to the drawings, and specifically to the form of the invention illustrated in FIGURES 1 to 4 inclusive, I have provided panels 1 and 2, which panels in the present instance are of rectangular outline and of equal width. The panels are in overlapped relationship as shown in FIGURE 2 and relatively adjustable lengthwise, so as to either extend paanel 1 relative to panel 2 or to otherwise adjust the degree of overlap. Adapted to be secured to the back 3 is a panel 4. This panel is shaped to conform to the cushion of the back 3, and overlies a portion of the front of the cushion. The panel 4 likewise is curved so as to overlie the top of the cushion as shown at 5. Reference to FIGURE 3 will show that the panel 4 is of greater width than that of the panels 1 and 2. This construction is resorted to in order to give stability to the device considered as an entirety as the panels 1 and 2 need only be wide enough to engage the shoulders, neck and back of the head, as illustrated in FIGURE 1. The lower end of panel 2 is secured to the panel 4 by a pair of spaced hinges 6 and 7 so that the back, head and neck panels 1 and 2 may assume various inclinations relative to the panel 4. The top 5 of the panel 4 is provided with an elongated channel member 8, see FIGURE 5, in that it has a base member 9 and two parallel side flanges 10 and 11 and which member 8 is transverse to the top 5 of the panel 4. A strap 12 has two angular portions 13 and 14, the portion 13 of which is provided with a longitudinally extending slot 15, there being a second strap 16 received within the channel member 8 and likewise provided with a longitudinal slot 17. Passed through the slots 15 and 17, the base 9 and the portion 5 of panel 4 is a bolt 18 carrying a nut 19 which bears against the top surface of one leg of a bent strap 16 so as to secure the straps within the channel member, in selected relative position. The strap 16 is secured to the panel 2 by hinge means designated generally as 20. The hinge means, in the present instance, may assume many forms and is here shown as consisting of a pair of spaced knuckles 21 and 22 with a knuckle portion 23 for the strap 16 positioned between the knuckles 21 and 22. A pin 24 interconnects the knuckles. Initially, it may be pointed out that the panel 4 is secured in position by strap 12 and particularly by engagement of the strap portion 14 with the back of the cushion 3. Thus, the panel 4 is held tightly to the back 3 by this construction.

To secure the panels 1 and 2 in overlapped relationship, the panel 2 is provided with a series of spaced apart vertically arranged transverse holes 25 along each side of the panel, and the panel 1 carries a pair of bent pins or brackets 26 on the rear surface thereof adapted to enter opposite side pairs of holes 25 (see FIGURE 6). I have found in practice that this is a satisfactory means and a stable one for securing the two panels in adjustable overlap. Adapted to overlie the front surface of the two panels 1 and 2, as well as the panel 4, is a padded cushion 27 (see FIGURE 7). This cushion has a back member 28 of fabric or other material and a front member 29. The cushion is padded to provide a portion which will lie between the back of the head, the neck and the shoulders as shown in FIGURE 1. From a protruding part, designated as 30, the cushion tapers downwardly and is of reduced thickness as shown at 31, the portion of reduced thickness overlying the panel 4. The sides of the cushion are closed in any suitable manner by end panels and I provide a back flap 32 which is secured along its sides and to the top of the material 28 as shown at 33 with an entrance portion at 34. It is intended that the portion between the back member 28 and the flap 32 should act as an envelope for receiving the panels 1 and 2, or at least a portion of each panel and enclosing the same, as illustrated in FIGURES 1 and 2.

In the form of the invention shown in FIGURE 8, I have adapted the construction to the back of a lounge type chair. The only feature changed is the shape of the cushion wherein the large protruding portion for engaging the neck, head and shoulders has been changed to provide an uniform front surface while the back of the cushion tapers to conform to the outline of the back of the chair. However, the cushion is held by the panels in the same manner as shown in FIGURE 3, although the cushion back 4 need not have as great a width as shown.

In the modification shown in FIGURE 9, in place of the straps 12 and 16, and the channel member 8, I provide a turnbuckle 40 engaging a pair of screws 41 and 42 having oppositely pitched threads, the screw 42 rockingly secured to the panel 2 by means 43 while the screw 41 is secured to means 44 carried by the top 5 of the panel 4. A member 45 having two portions 46 and 47, in angular relationship, and constituting a round bar, is passed through the means 44 and is surrounded by a spring 48, which spring engages the member 44 and a member 49 carried by the bar, the spring being in compression so as to cause the portion 45 to engage the back and thus hold the panel 4 in position of service.

The modification shown in FIGURE 10 consists in providing a single head, neck and back panel 50, secured to a strap 51 by means of a hinge 52, the strap being longitudinally slotted at 53 with a screw 54 passed through the portion 5 of the panel 4, and the said slot 53, the said screw carrying a nut 55 whereby the angularity assumed by the panel 50 may be adjusted relative to the cushion back 4, it being observed that the panel is hinged at its lower edge 56 to the panel 4. In addition, the portion 5 on its bottom surface carries a hinge 57, one leaf of which carries a flat foot 58 to enable the foot to be swung from the position shown in full lines to the dotted line position in FIGURE 10. Such a swinging motion of the foot allows the cushion member to rest on the floor, the foot engaging the foundation or the floor indicated at 59, while the opposite end of the panel 4 also engages the floor or foundation. In this instance the shape of the cushion is substantially the same as that shown in FIGURE 8.

The operation uses and advantages of the invention are as follows:

The device is attractive in appearance in its several forms and allows for ready adjustment of the cushion.

If the driver of a vehicle is to utilize the invention and particularly the form thereof shown in FIGURES 1 to 4, he first loosens the nut 19 on the screw threads of screw 18 and then applies the panel 4 over the front of the cushion 3 followed by adjusting the strap 12 so that the angular end 14 engages the back surface of the cushion. He then adjusts the angularity to be assumed by the panels 1 and 2, relative to panel 4, it being observed that panel 2 is hinged to the panel 4 and angularity of panel 2, as well as that of panel 1, is obtained by moving the strap 16 forwardly or backwardly in channel member 8 followed by tightening the nut 19 upon the threads of the screw 18. This of course is a simple procedure and is easily and quickly accomplished. The height or degree of overlap of the panel 1 relative to panel 2 is obtained by placing the pins 26 in different parallel aligned holes 25 on both sides of panel 2 to either raise or lower the cushion 27.

In the form of the invention shown in FIGURE 9, the turnbuckle 40 may be rotated to cause approach or separation of the screws 41 or 42 and thereby adjust the angularity of the panels 1 and 2 relative to panel 4. The extremity 47 of the rod 46 is held against the seat back of the vehicle by the compression spring 48.

That form of the invention in FIGURES 10 and 11 allows use of the device both as a seat back or on the floor.

Thus the invention is adaptable to many uses whether it be for chairs as shown in FIGURE 8, a vehicle as shown in FIGURES 1 and 2 and 9, or for use at the beach or on the floor as shown in FIGURE 11.

I claim:

A back and head rest adapted to be carried by the back of a seat, and including a first panel provided with top and bottom flanges adapted to overlie in part the front, top and bottom of the seat back and to conform generally with the contour of said back, an adjustable metal strap carried by the said panel for engaging an opposite surface of said seat back to hold the said panel to said back, a second and a third panel of identical width in overlapped relationship, the second panel being contiguous to the first panel and hinged at one edge to the first panel, a second strap hinged at one end to the second metal panel, and said second strap being movable lengthwise so as to swing said second and third panels forwardly or backwardly relative to the first panel, said second panel provided with a series of spaced apart holes, and said third panel formed with pins for entering said holes to adjust the degree of overlap between said second and third panels, and means for clamping the first and second named straps against movement when adjusted.

References Cited in the file of this patent

UNITED STATES PATENTS

| | | |
|---|---|---|
| 18,998 | Waters | Dec. 29, 1857 |
| 2,490,088 | Penn | Dec. 6, 1949 |
| 2,539,923 | Phaneuf | Jan. 30, 1951 |
| 2,560,925 | Brown | July 17, 1951 |
| 2,807,313 | Kauffman | Sept. 24, 1957 |